United States Patent Office 3,061,571
Patented Oct. 30, 1962

3,061,571
FLAME RETARDANT COMPOSITION COMPRISING AN ACRYLONITRILE CROSS-LINKED POLYESTER RESIN AND AN ORGANIC PHOSPHATE
Ivor Heberling Updegraff and Lennart Albert Lundberg, Stamford, Conn., assignors to American Cyanamid Company, New York, N.Y., a corporation of Maine
No Drawing. Filed Mar. 21, 1960, Ser. No. 16,170
12 Claims. (Cl. 260—30.6)

The present invention relates to novel polymerizable mixtures capable of forming flame-retardant hardened resins and also to the novel polymerization products obtained therefrom. More particularly, it relates to thermosetting, substantially flame resistant polyester resin compositions containing acrylonitrile and a phosphorus compound.

Thermosetting resin compositions of the unsaturated polyester type, as exemplified by a mixture of a linear propylene glycol maleate-phthalate polyester with monomeric styrene or a compound containing a terminal $CH_2=C<$ group as a cross-linking agent, have wide industrial applications. Unfortunately, such resin compositions exhibit a tendency to burn even when reinforced with considerable amounts of noncombustible materials. This shortcoming has hampered their use in structural and decorative applications, due to considerations of safety, increased insurance rates and building code restrictions and requirements. Although attempts have been made to improve these resins, such attempts have not resulted in wholly satisfactory compositions which are economical as well as substantially flame resistant. Accordingly, there exists a distinct need for improved polyester resin compositions which are substantially fire resistant and economical in cost.

It is, therefore, a principal object of the invention to provide improved heat-convertible polyester resin compositions capable of polymerizing into a flame-retardant, infusible and insoluble resin.

Another object of the invention is to provide improved flame-retardant, infusible and insoluble polyester resins.

Other objects and advantages of the invention will be apparent from the consideration of the ensuing detailed disclosure.

To this end, it has been unexpectedly found that small amounts of both acrylonitrile and a phosphorus compound in the form of a phosphate can be incorporated into typical unsaturated polyester compositions to render their polymerization products flame-resistant to the point where they are substantially self-extinguishing. Where a nitrogen compound, such as acrylonitrile, or a pentavalent phosphorus compound, such as triethylphosphate, is employed separately in the aforementioned typical unsaturated polyester composition, there is observed little or no flame-retardant effect. It is surprising that the combination of acrylonitrile and a phosphorus compound can be used to obtain highly desirable flame-retardant, self-extinguishing polyester resin compositions.

In accordance with the process of the instant invention, a mixture of acrylonitrile and an organic pentavalent phosphorus compound is added to a heat-convertible resin composition containing one or more unsaturated alkyd resin esters prepared by reacting a polyhydric alcohol and an ethylenically unsaturated polycarboxylic acid and, if desired, one or more monomeric compounds containing a $CH_2=C<$ group. Advantageously, it has been found that the order of mixing is not critical. A good practice, however, is to initially admix acrylonitrile, the organic phosphorus compound and the monomeric compound containing a $CH_2=C<$ group, and thereafter adding said admixture to an alkyd polyester resin while agitating.

At least one of a wide variety of linear polymeric substances containing reactive non-benzenoid unsaturation is a constituent of the above-mentioned copolymerizable mixtures. These are exemplified by the unsaturated linear polyesters of one or more polyhydric alcohols with one or more alpha, beta-ethylenically unsaturated polycarboxylic acids alone or in combination with one or more saturated polycarboxylic acids. Among the contemplated polyhydric alcohols are: ethylene glycol, diethylene glycol, propylene glycol, dipropylene glycol, trimethylene glycol, tetramethylene glycol, pinacol, arabitol, xylitol, dulcitol, adonitrol, mannitol, glycerol, trimethylol propane, trimethylol ethane, sorbitol, 1,1'-isopropylidene bis(p-phenylenoxy) di-2-propanol, pentaerythritol, dipentaerythritol, and alkanediols as for example, butanediol-1,2, butanediol-1,3, butanediol-1,4, pentanediol-1,2, pentanediol-1,4, pentanediol-1,5 and hexanediol-1,6. It is desirable that when a mixture of dihydric and higher polyhydric alcohols are used in forming the polyester, dihydric alcohol be employed in major proportion relative to any alcohol containing more than two hydroxy groups.

The expressions "polycarboxylic acids" and "dicarboxylic acids" are used herein in their broader sense to include available similarly reacting anhydrides, such as maleic and phthalic anhydrides. Among the suitable alpha, beta-ethylenically unsaturated acids are: maleic, fumaric, aconitic, itaconic, citraconic, mesaconic and chloromaleic acids. Substantial amounts of nonpolymerizable acids may also be used, but the polymerizable unsaturated acids should be present in an amount approximating at least 20% by weight of the total weight of the polycarboxylic acids used and preferably in amounts varying between about 25% and 65% by weight based on the total weight of polycarboxylic acids present. Examples of such nonpolymerizable polycarboxylic acids include: phthalic, oxalic, malonic, succinic, glutaric, sebacic, adipic, pimelic, suberic, azelaic, tricarballylic, citric, tartaric and malic acids.

In the preparation of the polymerizable unsaturated polyesters, a polyhydric alcohol and a polycarboxylic acid are admixed in substantially equimolar proportions and preferably with an excess of alcohol approximating 10% or 15% above the stoichiometric quantity required for complete esterification. Where a polyhydric alcohol containing more than two hydroxy groups or a polycarboxylic acid having more than two carboxyl groups is used, the stoichiometry should be adjusted accordingly to provide for esterification of these additional reactive groups. The alcohol and acid should be reacted sufficiently to produce an ultimate polyester resinous material having an acid number not greater than about 55, and preferably an acid number from about 35 to about 40.

The unsaturated polyester resin content may range from about 30% to about 90% of the total weight of copolymerizable material in the novel flame-retardant compositions, depending on the particular qualities desired in the final resin. In general, of from about 65% to about 75% of the unsaturated alkyd resin blended into the mixture is a good practice.

In addition to the unsaturated polyester, the compositions of the instant invention typically contain a monomeric cross-linking agent comprising one or more monomers containing a $CH_2=C<$ group and having a boiling point above 60° C. There may be mentioned the following compounds: styrene, styrenes with alkyl and halogen substituents on the ring and side chain such as o-, m- and p-methyl styrenes, 2,4-dimethyl styrene, 2,3-dimethyl styrene, 2,5-dimethyl styrene, alpha chlorostyrene, alpha ethyl styrene, p-ethylstyrene, m-propyl styrene, bromostyrene, dichlorostyrenes, dibromostyrenes, isopropenyl toluene, vinyl naphthalene, and the o-, m- and p-chlorostyrenes and bromostyrenes; esters of alpha-methylene aliphatic monocarboxylic acids, such as methyl acrylate, ethyl acrylate, n-butyl acrylate, isobutyl acrylate, dodecyl acrylate, 2-chlorethyl acrylate, 2-chloropropyl acrylate, 2,2'-dichlorisopropyl acrylate, phenyl acrylate, cyclohexyl acrylate, methyl alpha-chloroacrylate, methyl methacrylate, ethyl methacrylate, methyl ethacrylate; acrylonitrile. In general, of from about 5% to 20% of such monomer may be employed, and preferably from about 7.5% to about 10%, based upon the total weight of the composition.

Acrylonitrile is incorporated in the aforementioned resin composition as an essential component. Advantageously, it may be present in amounts ranging from 5% to about 25% based on the final resin composition and preferably from 10% to 20% provided that at least one other monomer containing terminal $CH_2=C<$ group is present. The acrylonitrile may, if desired, replace all the aforementioned monomers containing a $CH_2=C<$ group and in that event the acrylonitrile is present of from about 10% to about 45%, based on the weight of the final resin.

Advantageously, small amounts of a pentavalent phosphorus compound are used in the resin composition of the present invention. Thus, there is provided in the resultant resin mixture of from about 1% to about 10% of the phosphorus compound based on the weight of the final resin, and preferably of from about 5% to 7.5%. The pentavalent phosphorus compounds which can be employed herein are for example: mono-, di-, or trialkyl or alkylene phosphates wherein each of the alkyl groups contained are from one to about four carbon atoms such as methyl, ethyl, propyl, allyl and n-butyl and isomers thereof; mono-, di-, or tri-aryl phosphates, wherein the aryl group may be phenyl or naphthyl; mono-, di-, or tri-alkaryl phosphates. Exemplary of specific organic phosphates are: monoethyl phosphate, diethyl phosphate, trimethyl phosphate, triethyl phosphate, triallyl phosphate, tributyl phosphate, triphenyl phosphate and tricresyl phosphate.

Conventional additives may be included with the copolymerizable mixtures of the present invention. Such additives include, for instance, catalysts for curing, such as benzoyl peroxide or phthalic peroxide; promoters for use in conjunction with the catalyst for curing at room or lower temperatures; mold lubricants; fillers and reinforcements such as ground asbestos and glass fibers; inhibitors such as hydroquinone, to stabilize the resin mixtures against premature gelation; colorants such as compatible dyes and pigments; plasticizers for improving flow of said resin compositions in a mold. Curing of any of the new copolymers may be accomplished with or without added positive pressure at temperatures ranging from about 10° C. to about 150° C. or even higher. Where convenient, it is usually desirable to form copolymers by heating the catalyzed resin-forming mixture to between 90° C. to about 105° C. for a period of from 30 to 90 minutes.

It has been found that the novel cured resins possess self-extinguishing characteristics. As such they find utility as coating and film-covering materials, adhesives, binding agents, impregnating agents, reinforced plastic articles, molding compositions, laminating and casting resins.

In order to facilitate a further understanding of the invention, the following examples are given primarily for purposes of illustrating certain more specific details thereof. The scope of the invention is not to be deemed limited thereby, except as defined in the claims. Unless otherwise stated, the parts are by weight.

*Example 1*

An unsaturated alkyd resin was prepared by coreacting 6.6 mols of propylene glycol with three mols of phthalic anhydride and three mols of maleic anhydride to obtain a resinous ester composition having an acid number equal to about 25. A thermosetting resin syrup was obtained therefrom by mixing eleven parts of styrene, seventeen parts of acrylonitrile and six parts of triethyl phosphate and then dissolving sixty-six parts of the unsaturated polyester therein. Hydroquinone (0.008 part) was added to the mixture as an inhibitor against premature gelation.

A glass mat was saturated with the aforementioned resin syrup composition and catalyzed for polymerization by thoroughly mixing therewith 1% benzoyl peroxide. A two-ply laminate was obtained by curing the impregnated fiber glass for twenty minutes, at 105° C. under a pressure of 30 p.s.i.

In order to illustrate the self-extinguishing properties of the resin, the following test was conducted: the bottom one-inch strip of the glass laminate, comprising a strip five inches long, 0.5 inch wide and 0.06 inch thick, was exposed for 30 seconds at an angle of 45° to a 5-inch Bunsen burner flame having an inner cone about one-inch long; the burner was removed after exposure and the progress of combustion was observed.

The test strip prepared in the manner described did not burn appreciably. Rather, it displayed self-extinguishing characteristics in that the flame on the laminate disappeared within three to five second after removal of the Bunsen burner.

A thermosetting casting syrup was prepared in a similar manner as was the glass fiber laminate except that a lesser amount of catalyst was added. As little as one half the stated quantity of catalyst was found effective for the purpose. The resin was cast in a 1/16-inch thick glass cell, 5 inches long and 1/2-inch wide and cured for 10 hours at a temperature which was gradually raised from 125° F. to 200° F. in 6 hours and then held for an additional 3 hours at 250° F. When the cast-polymerized resin strip was subjected to the Bunsen flame test, continued burning did not occur. The flame was extinguished within five seconds.

In another test, acrylonitrile was used to replace all the styrene in the above-noted unsaturated polyester resin composition. Substantially the same flame test results were observed in both the laminate and cast resin strips.

*Example 2*

Polyester resin was prepared by dissolving 70 parts of the unsaturated alkyd resin described in Example 1 in 30 parts of styrene and 0.008 part of hydroquinone. Test specimens were laminated and cast under the curing conditions and employing the same quantities of benzoyl peroxide catalyst as in Example 1. It should be noted that in this example both acrylonitrile and triethyl phosphate have not been included.

In the flame test, the laminated as well as the cast specimens ignited readily and were not self-extinguishing as they continued to burn with the flame traveling over the entire 5-inch length of test strip after the removal of the Bunsen burner. The rate of burning was found to be equal to 0.8 inch per minute in each of the test specimens.

*Example 3*

Example 2 was repeated in all material aspects, except that the unsaturated alkyd resin was dissolved in a mixture of 13% styrene and 17% acrylonitrile. In the Bunsen burner test, the laminated and cast test specimens burned at the rate of 0.9 inch per minute.

*Example 4*

The process of Example 2 was repeated in every material aspect except that the unsaturated alkyd resin was dissolved in 24% styrene and 6% triethyl phosphate. The specimens subjected to the Bunsen burner test burned at the rate of 0.5 inch per minute.

Example 5

Example 1 was repeated in every material aspect, except that the alkyd resin was prepared by coreacting 2 mols of maleic anhydride, 1 mol of phthalic anhydride, and 3.1 mols of propylene glycol. Test specimens prepared utilizing the unsaturated alkyd resins so prepared demonstrated enhanced fire retardancy to the extent that burning did not occur when the test specimens were subjected to the Bunsen flame test.

Although the disclosure has been directed principally to the enhancement of polyester resins by the incorporation of a mixture of acrylonitrile and an organic phosphorus compound, such enhanced properties may be obtained by the incorporation of the aforementioned acrylonitrile-phosphate mixture in materials other than polyesters, as for example, in paint formulations and in thermoplastic resins.

Example 6

Example 5 was repeated in every material aspect, except that triphenyl phosphate was substituted for triethyl phosphate. Enhanced fire-retardant properties were noted in the test samples since they did not continue to burn and were extinguished within about five seconds.

In place of the triphenyl phosphate, both tricresyl phosphate and triallyl phosphate were individually employed. When test strips were subjected to the Bunsen burner tests, no substantial burning occurred since the flame was extinguished on withdrawal within about three seconds.

We claim:

1. A polymerizable composition of matter comprising (1) an ethylenically unsaturated polyester resin obtained by esterifying an $\alpha,\beta$-ethylenically unsaturated polycarboxylic acid and a polyhydric alcohol, (2) from about 5–20% by weight of a monomeric cross-linking agent for (1) containing a $CH_2=C<$ group and having a boiling point above 60° C., (3) from about 5–25% by weight of acrylonitrile, and (4) from about 1–10% by weight of a pentavalent phosphorus compound selected from the group consisting of alkyl phosphates, alkylene phosphates, aryl phosphates and alkaryl phosphates, said percentages being based on the weight of the total composition.

2. A polymerizable composition of matter comprising (1) an ethylenically unsaturated polyester resin obtained by esterifying an $\alpha,\beta$-ethylenically unsaturated polycarboxylic acid and a polyhydric alcohol, (2) from about 5–20% by weight of a monomeric cross-linking agent for (1) containing a $CH_2=C<$ group and having a boiling point above 60° C., (3) from about 5–25% by weight of acrylonitrile, and (4) from about 1–10% by weight of triethyl phosphate, said percentages being based on the weight of the total composition.

3. A polymerizable composition of matter comprising (1) an ethylenically unsaturated polyester resin obtained by esterifying an $\alpha,\beta$-ethylenically unsaturated polycarboxylic acid and a polyhydric alcohol, (2) from about 5–20% by weight of a monomeric cross-linking agent for (1) containing a $CH_2=C<$ group and having a boiling point above 60° C., (3) from about 5–25% by weight of acrylonitrile, and (4) from about 1–10% by weight of triallyl phosphate, said percentages being based on the weight of the total composition.

4. A polymerizable composition of matter comprising (1) an ethylenically unsaturated polyester resin obtained by esterifying an $\alpha,\beta$-ethylenically unsaturated polycarboxylic acid and a polyhydric alcohol, (2) from about 5–20% by weight of a monomeric cross-linking agent for (1) containing a $CH_2=C<$ group and having a boiling point above 60° C., (3) from about 5–25% by weight of acrylonitrile, and (4) from about 1–10% by weight of triphenyl phosphate, said percentages being based on the weight of the total composition.

5. An insoluble, infusible, flame-retardant resinous composition of matter obtained by polymerizing (1) an ethylenically unsaturated polyester resin obtained by esterifying an $\alpha,\beta$-ethylenically unsaturated polycarboxylic acid and a polyhydric alcohol, (2) from about 5–20% by weight of a monomeric cross-linking agent for (1) containing a $CH_2=C<$ group and having a boiling point above 60° C., (3) from about 5–25% by weight of acrylonitrile, and (4) from about 1–10% by weight of a pentavalent phosphorus compound selected from the group consisting of alkyl phosphates, alkylene phosphates, aryl phosphates and alkaryl phosphates, said percentages being based on the weight of the total composition.

6. An insoluble, infusible, flame-retardant resinous composition of matter obtained by polymerizing (1) an ethylenically unsaturated polyester resin obtained by esterifying an $\alpha,\beta$-ethylenically unsaturated polycarboxylic acid and a polyhydric alcohol, (2) from about 5–20% by weight of a monomeric cross-linking agent for (1) containing a $CH_2=C<$ group and having a boiling point above 60° C., (3) from about 5–25% by weight of acrylonitrile, and (4) from about 1–10% by weight of triethyl phosphate, said percentages being based on the weight of the total composition.

7. An insoluble, infusible, flame-retardant resinous composition of matter obtained by polymerizing (1) an ethylenically unsaturated polyester resin obtained by esterifying an $\alpha,\beta$-ethylenically unsaturated polycarboxylic acid and a polyhydric alcohol, (2) from about 5–20% by weight of a monomeric cross-linking agent for (1) containing a $CH_2=C<$ group and having a boiling point above 60° C., (3) from about 5–25% by weight of acrylonitrile, and (4) from about 1–10% by weight of triallyl phosphate, said percentages being based on the weight of the total composition.

8. An insoluble, infusible, flame-retardant resinous composition of matter obtained by polymerizing (1) an ethylenically unsaturated polyester resin obtained by esterifying an $\alpha,\beta$-ethylenically unsaturated polycarboxylic acid and a polyhydric alcohol, (2) from about 5–20% by weight of a monomeric cross-linking agent for (1) containing a $CH_2=C<$ group and having a boiling point above 60° C., (3) from about 5–25% by weight of acrylonitrile, and (4) from about 1–10% by weight of triphenyl phosphate, said percentages being based on the weight of the total composition.

9. A polymerizable composition of matter comprising (1) an ethylenically unsaturated polyester resin obtained by esterifying an $\alpha,\beta$-ethylenically unsaturated polycarboxylic acid and a polyhydric alcohol, (2) from about 10–45% by weight of acrylonitrile, and (3) from about 1–10% by weight of a pentavalent phosphorus compound selected from the group consisting of alkyl phosphates, alkylene phosphates, aryl phosphates and alkaryl phosphates, said percentages being based on the weight of the total composition.

10. A polymerizable composition of matter comprising (1) an ethylenically unsaturated polyester resin obtained by esterifying an $\alpha,\beta$-ethylenically unsaturated polycarboxylic acid and a polyhydric alcohol, (2) from about 10–45% by weight of acrylonitrile, and (3) from about 1–10% by weight of triethyl phosphate, said percentages being based on the weight of the total composition.

11. An insoluble, infusible, flame-retardant resinous composition of matter obtained by polymerizing (1) an ethylenically unsaturated polyester resin obtained by esterifying an $\alpha,\beta$-ethylenically unsaturated polycarboxylic acid and a polyhydric alcohol, (2) from about 10–45% by weight of acrylonitrile, and (3) from about 1–10% by weight of a pentavalent phosphorus compound selected from the group consisting of alkyl phosphates, alkylene phosphates, aryl phosphates and alkaryl phosphates, said percentages being based on the weight of the total composition.

12. An insoluble, infusible, flame-retardant resinous composition of matter obtained by polymerizing (1) an ethylenically unsaturated polyester resin obtained by esterifying an α,β-ethylenically unsaturated polycarboxylic acid and a polyhydric alcohol, (2) from about 10–45% by weight of acrylonitrile, and (3) from about 1–10% by weight of triethyl phosphate, said percentages being based on the weight of the total composition.

References Cited in the file of this patent

UNITED STATES PATENTS

| | | |
|---|---|---|
| 2,602,037 | Nelb | July 1, 1952 |
| 2,783,215 | Boritschek et al. | Feb. 26, 1957 |
| 2,857,303 | Wilson | Oct. 21, 1958 |
| 2,881,147 | Graham | Apr. 7, 1959 |